(12) United States Patent
Boggio

(10) Patent No.: US 10,124,752 B2
(45) Date of Patent: Nov. 13, 2018

(54) HEALTH EVALUATION AND PROGNOSTIC METHOD FOR NON-MONOTONIC DEPENDENT PARAMETERS

(71) Applicant: The Boeing Company, Chicago, IL (US)

(72) Inventor: John M. Boggio, Columbia, IL (US)

(73) Assignee: The Boeing Company, Chicago, IL (US)

(*) Notice: Subject to any disclaimer, the term of this patent is extended or adjusted under 35 U.S.C. 154(b) by 198 days.

(21) Appl. No.: 15/165,706

(22) Filed: May 26, 2016

(65) Prior Publication Data

US 2017/0341606 A1 Nov. 30, 2017

(51) Int. Cl.
| | |
|---|---|
| *B60R 16/023* | (2006.01) |
| *B64D 13/08* | (2006.01) |
| *B64D 45/00* | (2006.01) |
| *B64D 13/06* | (2006.01) |
| *G07C 5/08* | (2006.01) |

(52) U.S. Cl.
CPC ......... *B60R 16/0232* (2013.01); *B64D 13/08* (2013.01); *G07C 5/0841* (2013.01); *B64D 2013/0603* (2013.01); *B64D 2045/0085* (2013.01)

(58) Field of Classification Search
None
See application file for complete search history.

(56) References Cited

U.S. PATENT DOCUMENTS

| | | | | |
|---|---|---|---|---|
| 5,566,091 | A | * 10/1996 | Schricker | F01N 11/002 340/439 |
| 2006/0181427 | A1 | * 8/2006 | Bouse | G05B 19/4065 340/657 |
| 2008/0312783 | A1 | 12/2008 | Mansouri et al. | |
| 2011/0299470 | A1 | 12/2011 | Mueller et al. | |
| 2015/0369236 | A1 | * 12/2015 | Campagna | F04B 51/00 702/34 |

FOREIGN PATENT DOCUMENTS

EP 2415623 A1 2/2012

OTHER PUBLICATIONS

Search Report for related European Application No. EP17170377.0; report dated Jul. 5, 2017.

* cited by examiner

*Primary Examiner* — John Kuan
(74) *Attorney, Agent, or Firm* — Miller, Matthias & Hull LLP

(57) ABSTRACT

A method of evaluating health of a control system with fluctuating parameters is provided. The method may include receiving session data including actual parameters and target parameters of the control system, segmenting the session data into one or more data segments, calculating a segment score for each data segment based on at least a linear regression correlation coefficient and an average parameter difference, generating a session score based on a combination of the segment scores, and generating a notification indicative of a comparison between the session score and a predefined threshold.

20 Claims, 4 Drawing Sheets

HEALTH EVALUATION AND PROGNOSTIC METHOD FOR NON-MONOTONIC DEPENDENT PARAMETERS

TECHNICAL FIELD

The present disclosure relates generally to data analytics, and more particularly, to systems and methods for using analytics of non-monotonic dependent parameters to evaluate the health of control systems.

BACKGROUND

Analytics are employed in a wide range of different applications and can be valuable for the breadth of information they provide for almost any given control system. Among other things, analytics can be used to identify meaningful relationships between actual data and target data, which can further be used to evaluate and correct deficiencies within control systems. In climate-control systems, for example, actual temperatures or other relevant parameters within the controlled environment can be monitored relative to target temperatures or parameters in order to assess the functionality of the associated temperature controllers. Although applicable to almost any climate-controlled environment, temperature analytics may be particularly useful in monitoring cabin temperatures within an aircraft which can fluctuate widely over relatively short periods of time. Temperature analytics may also be useful in other mobile environments, such as in passenger vehicles, buses, trains, boats, and the like, as well as in stationary environments, such as in residential buildings, commercial buildings, and the like.

While conventional analytics techniques may be helpful, there is still room for improvement. When used to analyze cabin temperatures in aircraft, for instance, conventional techniques typically provide a mere snapshot comparison of the actual and target temperatures, which fails to adequately characterize functionality. For example, a large difference between actual and target temperatures in one instance could be flagged as a failure even when the actual temperature is properly approaching the target temperature. Other conventional techniques may evaluate the instantaneous change in the cabin temperature in order to determine whether the actual temperature is approaching or deviating from the target temperature. However, momentary deviations between actual and target temperatures are not exclusive to a malfunctioning system, and can often occur even under normal operating conditions. Conventional analytics are thus inadequate for evaluating actual and target temperature parameters, or other fluctuating non-monotonic dependent parameters.

Accordingly, there is a need for improved and more intuitive techniques for monitoring and analyzing non-monotonic parameters which address the foregoing limitations and provide more reliable health evaluations of a controlled system.

SUMMARY OF THE DISCLOSURE

In accordance with one aspect of the present disclosure, a method of evaluating health of a control system with fluctuating parameters is provided. The method may include receiving, at a controller, session data including actual parameters and target parameters from the control system, segmenting, at the controller, the session data into one or more data segments, calculating, at the controller, a segment score for each data segment based on at least a linear regression correlation coefficient and an average parameter difference, generating, at the controller, a session score based on a combination of the segment scores, and generating, at the controller, a notification indicative of a comparison between the session score and a predefined threshold.

In accordance with another aspect of the present disclosure, a controller for evaluating health of a control system with fluctuating parameters is provided. The controller may include a communication module, a segmentation module, a data analysis module, and a scoring module. The communication module may be configured to acquire session data including actual parameters and target parameters of the control system. The segmentation module may be configured to segment the session data into one or more data segments. The data analysis module may be configured to calculate a segment score for each data segment based on at least a linear regression correlation coefficient and an average parameter difference. The scoring module may be configured to generate a session score based on a combination of the segment scores.

In accordance with a further aspect of the present disclosure, an information management system for evaluating fluctuating parameters is provided. The information management system may include a sensor network configured to detect one or more actual parameters, a control system configured to adjust the one or more actual parameters based on corresponding target parameters, and a controller in electrical communication with the sensor network and the control system. The controller may be configured to acquire session data based on the actual parameters and the target parameters, segment the session data into one or more data segments, calculate a segment score for each data segment based on at least a linear regression correlation coefficient and an average parameter difference, and generate a session score based on a combination of the segment scores.

The features, functions and advantages that have been discussed can be achieved independently in various embodiments or may be combined in yet other embodiments, further details of which can be seen with reference to the following description and drawings.

DETAILED DESCRIPTION

Although the following sets forth a detailed description of different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection. It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent other than the language of the claims. To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Figure 1:
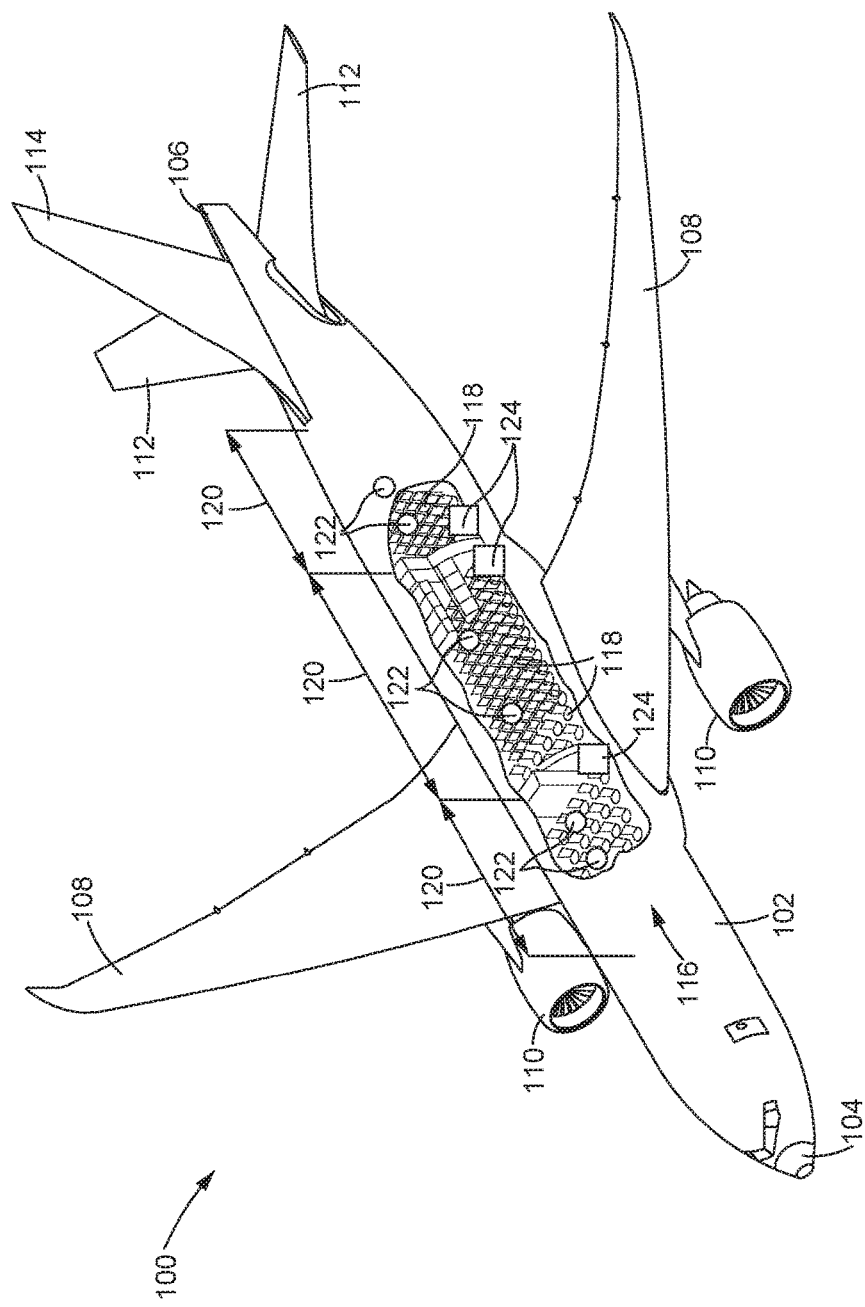
FIG. 1 is a perspective and diagrammatic view of a climate control arrangement for an aircraft cabin.

Referring now to FIG. 1, one illustration of an aircraft 100 that may be used in conjunction with the teachings of the present disclosure is provided. In general, the aircraft 100 includes a body 102 having a nose section 104 and a tail section 106, and wings 108 extending from the body 102. As shown in FIG. 1, the aircraft 100 further includes engines 110 attached to the wings 108, as well as horizontal stabilizers 112 and a vertical stabilizer 114 attached to the tail section 106 of the body 102. The aircraft 100 additionally provides a passenger cabin 116 and seats 118 for passengers located within the body 102, which can be designated into two or more zones 120. Furthermore, each zone 120 of the cabin 116 includes one or more sensor devices, such as temperature sensors 122 for measuring actual cabin temperature, and one or more cabin temperature control devices 124 for adjusting or controlling the cabin temperature. Although the embodiment of FIG. 1 depicts one possible arrangement for implementing climate control within an aircraft, it will be understood that other climate control arrangements and/or other types of controlled environments, such as those not necessarily related to aircrafts and/or temperature controls, are also possible.

Figure 2:
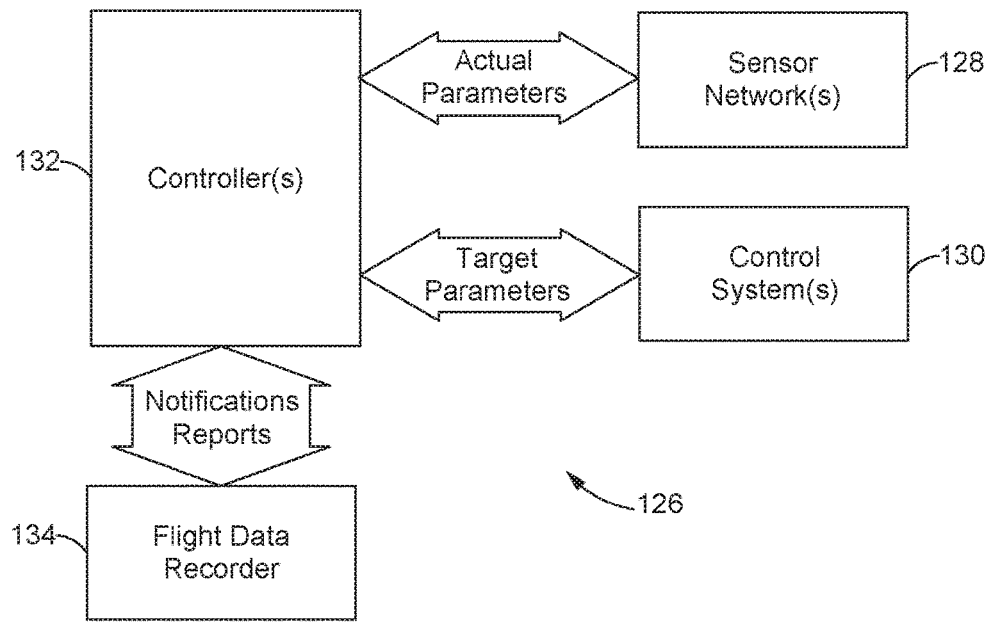
FIG. 2 is a diagrammatic view of one exemplary information management system provided in accordance with the teachings of the present disclosure.

Turning to FIG. 2, one exemplary embodiment of an information management system 126 that may be used to evaluate fluctuating cabin temperatures within the aircraft 100 of FIG. 1 is provided. As shown, the information management system 126 includes at least a sensor network 128, a control system 130, and a controller 132 in communication with each of the sensor network 128 and the control system 130. In applications related to aircraft 100, the information management system 126 may also include a flight data recorder 134 configured to communicate with the controller 132 and record significant events of a given flight. The sensor network 128 includes the temperature sensors 122 of FIG. 1 to provide actual temperature parameters measured from within the cabin 116. The control system 130 includes the cabin temperature control devices 124 of FIG. 1 to provide target temperature parameters, such as desired cabin temperatures manually set by an operator and/or automatically set based on preprogrammed controls. The controller 132 receives and compares the actual temperature parameters and the target temperature parameters, and evaluates the health of the cabin temperature control devices 124 based on the comparison. Although the information management system 126 of FIG. 2 is used to evaluate the health of cabin temperature control devices 124, the information management system 126 may similarly be used to analyze other parameters and evaluate the health of systems and components other than cabin temperature control devices 124.

Figure 3:
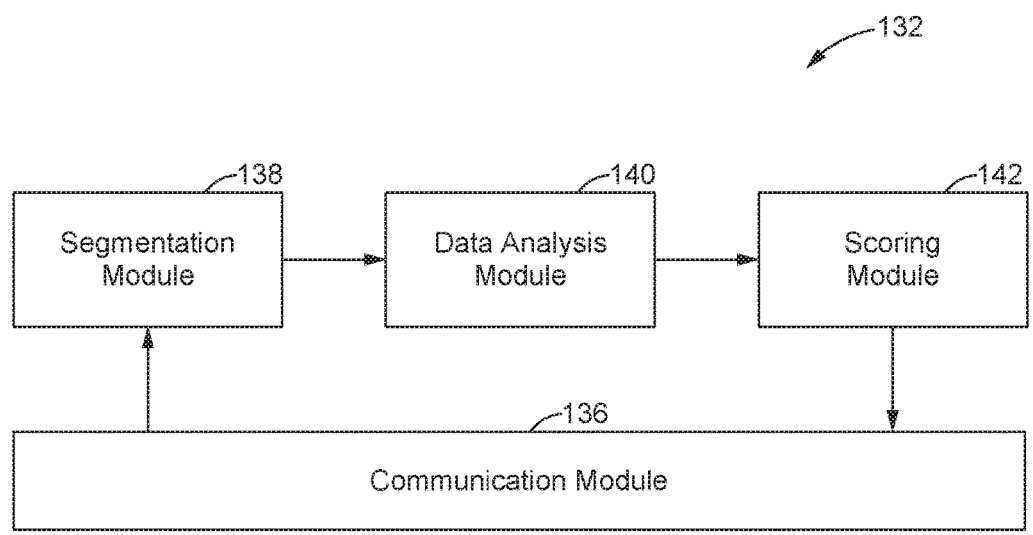
FIG. 3 is a diagrammatic view of one exemplary controller configured for use with the information management system of FIG. 2.

As further shown in FIG. 3, one exemplary embodiment of the controller 132 of the information management system 126 is provided in more detail. The controller 132 may be implemented using any one or more of a processor, a microprocessor, a microcontroller, a field programmable gate array (FPGA), a programmable read-only memory (PROM), or any other device that can be operated in accordance with preprogrammed instructions and/or algorithms disclosed herein. Furthermore, the controller 132 may be preprogrammed according to one or more sets of algorithms or code that can generally be categorized into different modules of the controller 132, or combinations of hardware and software that are distinguishable by the tasks performed. In the embodiment FIG. 3, for example, the controller 132 is preprogrammed to include a communication module 136, a segmentation module 138, a data analysis module 140 and a scoring module 142. However, in other embodiments, the controller 132 can be preprogrammed according to any other suitable arrangement of modular sets of algorithms or code to perform comparable functions.

Figure 4:
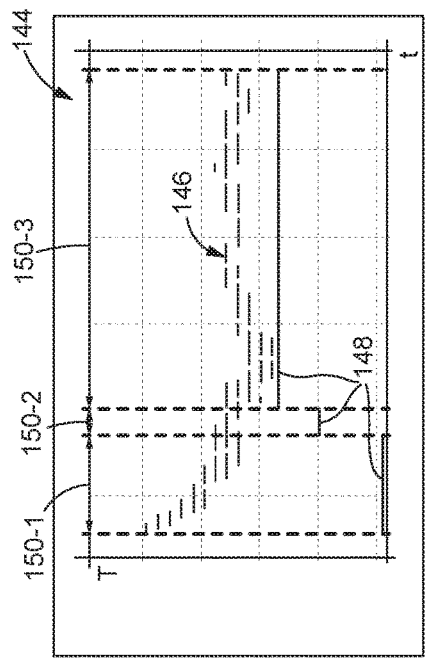
FIG. 4 is a graphical view of session data including actual parameters and target parameters.
Figure 5:
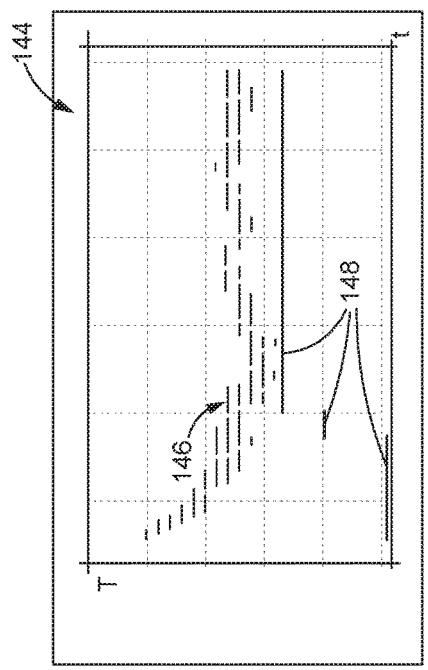
FIG. 5 is a graphical view of the session data of FIG. 4 divided into three data segments.

According to FIGS. 2 and 3, the communication module 136 of the controller 132 is configured to acquire session data 144, such as data received via the information management system 126 of FIG. 2 over a given duration or session. As shown by the session data 144 graphically shown in FIG. 4, for example, one session may correspond to the duration of a single flight of an aircraft 100, and the data may correspond to fluctuations in cabin temperatures during the flight. Furthermore, the session data 144 includes a combination of actual temperature parameters 146 provided by the sensor network 128 and target temperature parameters 148 provided by the control system 130. Additionally, the segmentation module 138 of FIG. 3 is configured to receive the session data 144 via the communication module 136, and segment the session data 144 into one or more data segments 150 as shown for example in FIG. 5. While the segmentation module 138 may segment the session data 144 according to any variety of conditions, the session data 144 in FIG. 5 is segmented based on changes in the target temperature parameters 148 and is not necessarily divided into data segments 150 of equal durations. In FIG. 5, for instance, the segmentation module 138 segments the session data 144 into three data segments 150 based on three different target temperature parameters 148 shown.

Still referring to FIG. 3, the data analysis module 140 of the controller 132 is configured to analyze each data segment 150 provided by the segmentation module 138, and calculate a segment score for each individual data segment 150. The segment score quantifies the relative agreement or disagreement between the actual temperature parameters 146 and the target temperature parameters 148 for a given data segment 150 in numerical, graphical and/or other suitable format. In each of the data segments 148 of FIGS. 6-8, for example, a numerical segment score is calculated based on characteristics of the data segment 150. Relevant characteristics of the data segment 150 include the linear regression correlation coefficient ($r^2$) of the actual temperature parameters 146, the average difference ($\mu_{\Delta p}$) between the actual temperature parameters 146 and the target temperature parameters 148, the average slope or trend (m) of the actual temperature parameters 146, the duration (d) of each data segment 150, the percentage of the duration (d) the actual temperature parameters 146 are not within acceptable range, such as within approximately 1° F., of the target temperature parameters 148, and any derivations thereof.

More particularly, the linear regression correlation coefficient ($r^2$) helps to quantify the consistency of the change in the actual temperature parameter 146 with respect to time, while the average difference ($\mu_{\Delta p}$) serves to quantify the agreement or disagreement between the actual and desired cabin temperatures. Furthermore, the average trend (m) determines whether the actual temperature parameters 146 are moving toward or away from the target temperature parameters 148, as well as the rate at which the actual temperature parameters 146 are moving, while the duration (d) of each data segment 150 defines a common reference by which different segment scores can be scaled or compared. By applying on one or more of these characterizations to preprogrammed equations or scoring algorithms, the data analysis module 140 is able to generate a segment score or derive other characterizations that more intuitively evaluate the health of the cabin temperature control device 124. The scoring algorithms may use any combination of mathematical functions or calculations which scale and/or weigh the above characteristics according to relevance to the health evaluation. For instance, simple calculations can be used to determine the percentage of the duration (d) the actual temperature parameters 146 are not within acceptable range of the target temperature parameters 148 to assess the ability of the cabin temperature control device 124 to match a desired cabin temperature. Similar calculations can be used to generate the segment score. Other relevant variables, characteristics or techniques for scoring each data segment 150 are possible and will be apparent to those of ordinary skill in the art.

Once a segment score for each data segment 150 has been calculated, the scoring module 142 in FIG. 3 generates a session score, or a total score for the entire session, based on the individual segment scores. Similar to the segment scores, the session score quantifies the agreements or disagreements between the actual temperature parameters 146 and the target temperature parameters 148 in numerical, graphical and/or other suitable formats. For example, the scoring module 142 may calculate the session score based on a weighted average of the individual segment scores, where each segment score is weighted based on the duration of the corresponding data segment 150. Furthermore, the scoring module 142 may additionally be configured to numerically and/or graphically compare the session score with predefined thresholds, ranges, or other frames of reference, to prognose, diagnose, or otherwise evaluate the ability of the cabin temperature control device 124 to match target temperature parameters 148. For example, the scoring module 142 is able to compare the current session score relative to sessions scores previously calculated from other sessions or flights, and flag those sessions exhibiting notable deviations. Other criteria or thresholds may also be used to assess the session score.

Referring again to FIG. 3, the communication module 136 is further configured to communicate any flagged sessions, such as sessions exhibiting undesirable session scores, to the appropriate maintenance or operations personnel. As shown in FIG. 2, for example, the communication module 136 can generate an event, an alert or some other form of notification to be included within a report of the flight data recorder 134. In alternative embodiments, the communication module 136 may electronically transmit notifications using other communication modes available to the information management system 126. While other types of notifications may be provided, the communication module 136 provides at least information indicative of a comparison between the session score and some predefined threshold. The predefined threshold may be at least partially derived from session scores corresponding to previously obtained session data. Furthermore, the notification may include information pertaining to possible failures within the temperature sensors 122, the cabin temperature control device 124, the information management system 126, the sensor network 128 and the control system 130.

Figure 9:
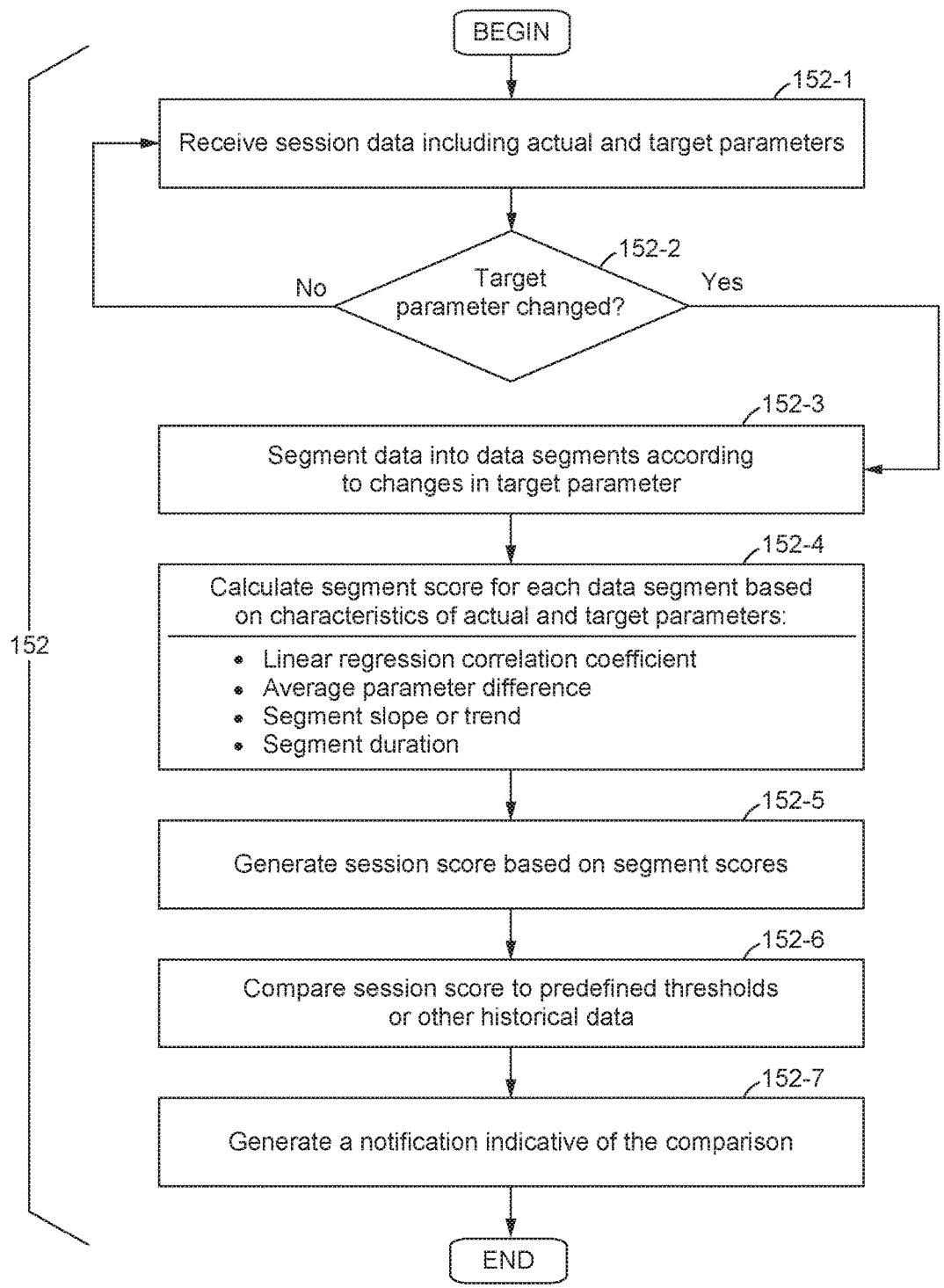
FIG. 9 is a diagrammatic view of one exemplary method for evaluating the health of a control system with fluctuating parameters provided in accordance with the present disclosure.

Turning now to FIG. 9, one exemplary algorithm or method 152 of evaluating the health of a control system 130 with fluctuating parameters is provided. Although not limited to cabin temperatures, the method 152 of FIG. 9 for instance is implemented with respect to control systems 130 for aircraft and used to evaluate the ability of the cabin temperature control devices 124 to match target temperature parameters 148. As shown in FIG. 4, the method 152 in block 152-1 initially receives session data 144, such as actual temperature parameters 146 from temperature sensors 122 and target temperature parameters 148 from cabin temperature control devices 124. The method 152 in block 152-2 further determines whether there are any changes in the target temperature parameter 148, such as changes manually or automatically set via the cabin temperature control device 124. If the target temperature parameter 148 remains substantially the same, such as within approximately 1° F., or the like, the method 152 continues receiving session data 144 per block 152-1. If, however, the target temperature parameter 148 changes, the method 152 in block 152-3 segments the session data 144 into data segments 150 based on the different target temperature parameters 148, as shown for example in FIG. 5.

Figure 8:
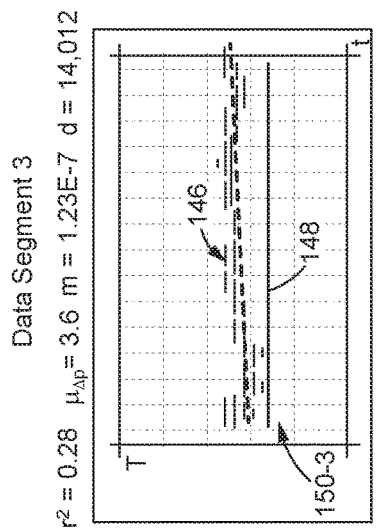
FIG. 8 is a graphical view of the third data segment of FIG. 5 and characteristics thereof.
Figure 7:
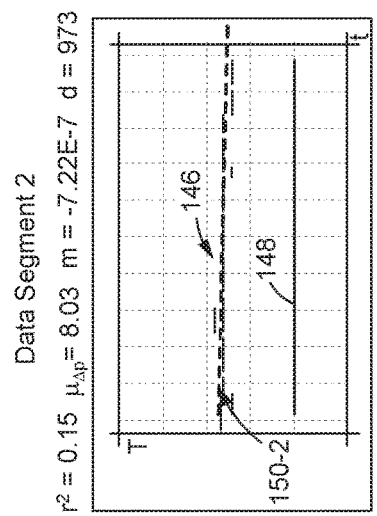
FIG. 7 is a graphical view of the second data segment of FIG. 5 and characteristics thereof.
Figure 6:
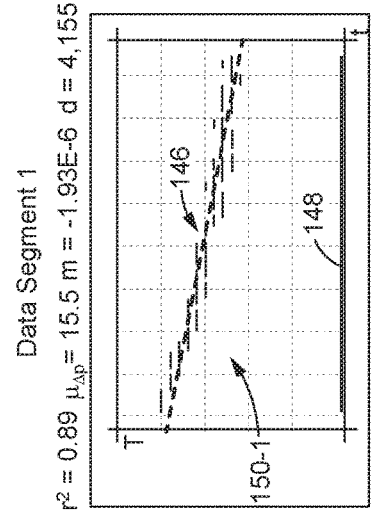
FIG. 6 is a graphical view of the first data segment of FIG. 5 and characteristics thereof.

According to block 152-4 of FIG. 9, the method 152 additionally calculates a segment score for each data segment 150 based on various characteristics of the data or parameters within the data segment 150. As shown in FIGS. 6-8 for instance, the method 152 may calculate each segment score based on one or more of the linear regression correlation coefficient ($r^2$) of the actual temperature parameters 146, the average difference ($\mu_{\Delta p}$) between the actual temperature parameters 146 and the target temperature parameters 148, the average slope or trend (m) of the actual temperature parameters 146, the duration (d) of each data segment 150, the percentage of the duration (d) the actual temperature parameters 146 are not within acceptable range, such as within approximately 1° F., of the target temperature parameters 148, and any derivations thereof. The method 152 may also apply one or more preprogrammed equations or scoring algorithms to determine the segment score for each data segment 150.

Once a segment score for each data segment 150 has been calculated, the method 152 in block 152-5 of FIG. 9 generates a session score, or a total score for the entire session, based on the individual segment scores. For example, the method 152 may calculate the session score based on a weighted average of the individual segment scores, where each segment score is weighted based on the duration of the corresponding data segment 150. Additionally, in block 152-6, the method 152 numerically and/or graphically compares the session score with predefined thresholds, ranges, or other frames of reference, such as historical data, to evaluate the health of the cabin temperature control device 124, sensor network 128 and control systems 130. For example, the method 152 may compare the current session score to session scores previously calculated from other sessions or flights, and flag those sessions exhibiting notable deviations. The method 152 may alternatively perform other types of comparisons or assessments that may be helpful in evaluating the functionalities of the cabin temperature control device 124, sensor network 128 and control systems 130.

Furthermore, in block 152-7 of FIG. 9, the method 152 additionally generates a notification that is indicative of the comparisons, or the results of the comparisons, made between the session score and one or more predefined thresholds or historical data. More specifically, the notification may be capable of communicating any significant events, such as events exhibiting undesirable session scores, to the appropriate maintenance or operations personnel. In one example, a notification may be included within a report of the flight data recorder 134 of FIG. 2. In other examples, the method 152 may generate and electronically transmit notifications using any other mode of communication available. The notification may also include information pertaining to possible failures within any one or more of the temperature sensors 122, the cabin temperature control device 124, the information management system 126, the sensor network 128, the control system 130, and the like.

Accordingly, the present disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of evaluating health of a climate control system with fluctuating parameters, comprising:
    measuring actual temperature parameters by one or more temperature sensors of a sensor network;
    setting, at one or more temperature control devices, target temperature parameters;
    receiving, at a controller, session data including the actual temperature parameters and the target temperature parameters from the climate control system;
    segmenting, at the controller, the session data into one or more data segments;
    calculating, at the controller, a segment score for each of the data segments based on at least one of a linear regression correlation coefficient and an average parameter difference;
    generating, at the controller, a session score based on a combination of the segment scores;
    generating, at the controller, an alert providing a notification indicative of a comparison between the session score and a predefined threshold; and
    including the notification within a report of a flight data recorder, the notification including information pertaining to one or more failures.

2. The method of claim 1, wherein the target temperature parameters and the actual temperature parameters are of a cabin of an aircraft, and the notification is communicated to the flight data recorder.

3. The method of claim 1, wherein the session data is segmented into one or more data segments based on changes in the target temperature parameters.

4. The method of claim 1, wherein the segment score is further calculated based on a segment trend and a segment duration.

5. The method of claim 4, wherein the segment score is calculated according to a scoring algorithm, the scoring algorithm being configured to calculate the segment score based on the linear regression correlation coefficient of the actual temperature parameters, the average difference between the actual temperature parameters and the target temperature parameters, an average slope of the actual temperature parameters, a percentage of time the actual temperature parameters are not within an acceptable range of the target temperature parameters, and a duration of the data segment.

6. The method of claim 1, wherein the notification includes information pertaining to one or more failures in the temperature sensors, the temperature control devices, and the sensor network.

7. The method of claim 1, wherein the predefined threshold includes one or more session scores corresponding to previously obtained session data.

8. The method of claim 1, wherein the notification includes information pertaining to one or more failures in the climate control system responsible for controlling the actual temperature parameters.

9. A controller for evaluating health of a climate control system with fluctuating parameters, comprising:
    one or more temperature sensors of a sensor network configured to detect one or more actual temperature parameters;
    one or more temperature control devices configured to set a target temperature parameter;
    a communication module configured to acquire session data including the actual temperature parameters and the target temperature parameters of the climate control system;
    a segmentation module configured to segment the session data into one or more data segments;
    a data analysis module configured to calculate a segment score for each of the data segments based on at least one of a linear regression correlation coefficient and an average parameter difference;
    a scoring module configured to generate a session score based on a combination of the segment scores; and
    wherein the communication module is further configured to generate a notification indicative of a comparison between the session score and a predefined threshold and include the notification within a report of a flight data recorder, the notification including information pertaining to one or more failures.

10. The controller of claim 9, wherein the target temperature parameters and the actual temperature parameters are of a cabin of an aircraft detected by one or more temperature sensors, the communication module further being configured to communicate the notification to the flight data recorder.

11. The controller of claim 9, wherein the segmentation module is configured to segment the session data into one or more data segments based on changes in the target temperature parameters, and the scoring module is configured to generate the session score based on the segment score and a segment duration of each of the data segments.

12. The controller of claim 9, wherein the data analysis module is configured to calculate the segment score according to a scoring algorithm, the scoring algorithm being configured to calculate the segment score based on the linear regression correlation coefficient of the actual temperature parameters, the average difference between the actual temperature parameters and the target temperature parameters, an average slope of the actual temperature parameters, a percentage of time the actual temperature parameters are not within an acceptable range of the target temperature parameters, and a duration of the data segment.

13. The controller of claim 9, wherein the predefined threshold includes one or more session scores corresponding to previously obtained session data, and the notification includes information pertaining to one or more failures in the climate control system responsible for controlling the actual temperature parameters.

14. An information management system for evaluating fluctuating temperature parameters, comprising:
   a sensor network configured to detect one or more actual temperature parameters;
   one or more temperature control devices configured to adjust the one or more actual temperature parameters by setting corresponding target temperature parameters; and
   a controller in electrical communication with the sensor network and the temperature control devices, the controller configured to acquire session data based on the actual temperature parameters and the target temperature parameters, segment the session data into one or more data segments, calculate a segment score for each of the data segments based on at least a linear regression correlation coefficient and an average parameter difference, generate a session score based on a combination of the segment scores, generate a notification indicative of a comparison between the session score and a predefined threshold, and include the notification within a report of a flight data recorder, the notification including information pertaining to one or more failures.

15. The information management system of claim 14, wherein the target temperature parameters and the actual temperature parameters are of a cabin of an aircraft detected by one or more temperature sensors.

16. The information management system of claim 14, wherein the controller is configured to segment the session data into one or more data segments based on changes in the target temperature parameters.

17. The information management system of claim 14, wherein the controller is configured to calculate the segment score further based on a segment trend and a segment duration.

18. The information management system of claim 14, wherein the controller is configured to calculate the segment score according to a scoring algorithm, the scoring algorithm being configured to calculate the segment score based on the linear regression correlation coefficient of the actual temperature parameters, the average difference between the actual temperature parameters and the target temperature parameters, an average slope of the actual temperature parameters, a percentage of time the actual temperature parameters are not within an acceptable range of the target temperature parameters, and a duration of the data segment.

19. The information management system of claim 14, wherein the controller is configured to generate the session score based on the segment score and a segment duration of each of the data segments.

20. The information management system of claim 14, wherein the controller is further configured to communicate the notification to the flight data recorder, the predefined threshold including one or more session scores corresponding to previously obtained session data, the notification including information pertaining to one or more failures in the climate control system responsible for controlling the actual parameters.

* * * * *